United States Patent Office 3,331,445
Patented July 18, 1967

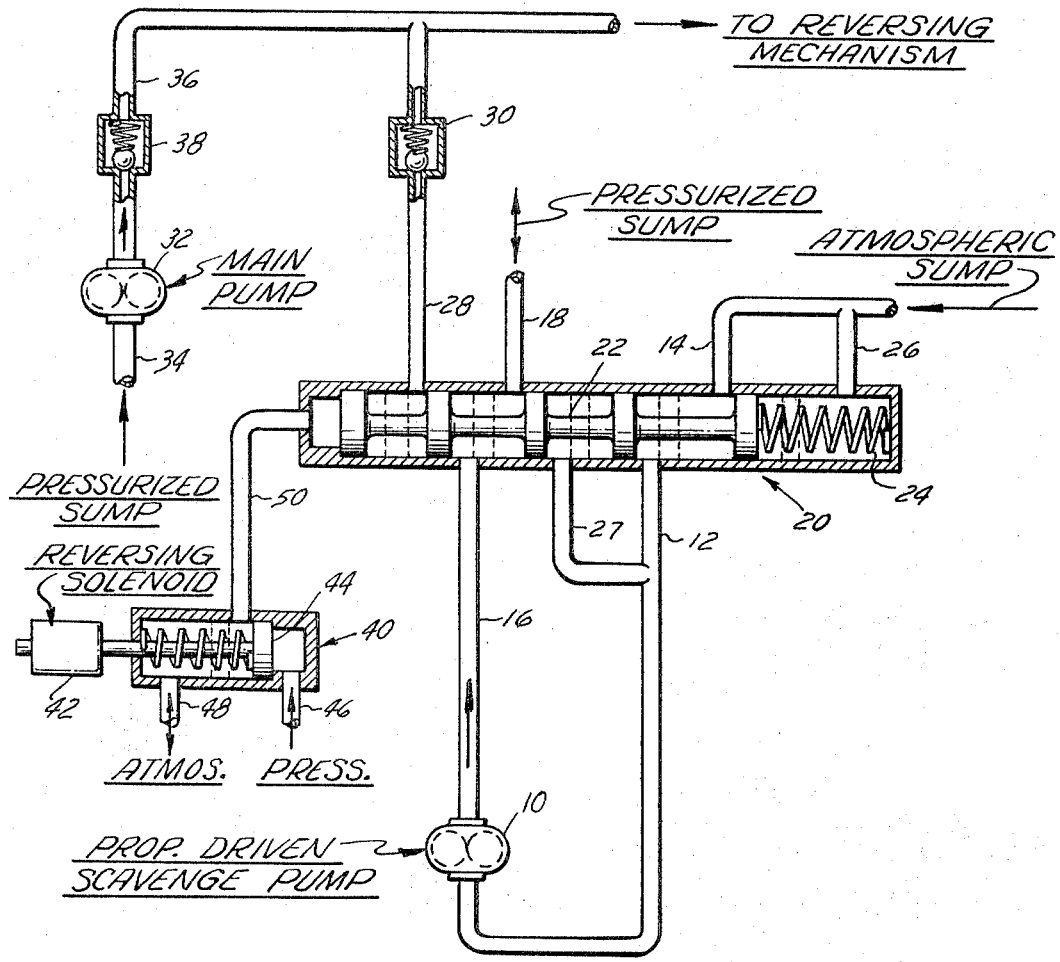

3,331,445
MEANS FOR INCREASED PITCH CHANGE RATE
Daniel P. Currie, 704A Windsor Ave.,
Windsor, Conn. 06095
Filed Dec. 14, 1965, Ser. No. 513,747
5 Claims. (Cl. 170—160.32)

This invention relates to an hydraulic system which is adapted to increase the rate of changing the pitch of an hydraulically controlled aircraft propeller into the reverse or braking pitch range.

In a conventional aircraft propeller structure an hydraulically operated mechanism is employed to control the pitch of the propeller blades, and this same mechanism or a separate hydraulically operated mechanism can be used to reverse the pitch of the propeller blades for the purpose of braking the aircraft.

When reversing propeller pitch, it is desirable to have the blades reach the reverse pitch range as soon as possible, this to obtain the desired thrust response as soon as it can be obtained and to pass the propeller from a relatively high pitch setting through the relatively low pitch range into the reverse pitch range as quickly as this can be accomplished so as to minimize the chance of propeller overspeeding in the lower pitch range. The rate at which the propeller pitch can be changed into the reverse range depends upon the rate and pressure at which hydraulic fluid can be supplied to the reversing mechanism so as to actuate the same. In conventional propeller structures and hydraulic control systems therefor, a pump is selectively operated by the aircraft pilot or engineer to pump fluid to the reversing mechanism to reverse the propeller pitch.

It is the general object of the present invention to supplement the operation of the aforementioned reversing pump so as to increase the flow of pressurized fluid to the reversing mechanism whereby to increase its rate of operation and the rate of pitch change into the reverse range.

It is a further and more specific object of the invention to supplement the reversing pump operation with pump means provided in a conventional propeller hydraulic system for other more normal use and purpose.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing comprises a schematic illustration of so much of an aircraft propeller control system as is needed for an understanding of the pitch reversing operation.

The conventional hydraulic system, which the present invention improves upon, includes a first sump at atmospheric pressure, a first pump which is a scavenge pump which withdraws fluid from the atmospheric sump and pumps into a second sump under pressure, the said second sump being referred to as a pressurized sump. In the conventional system, the first or atmospheric sump receives the hydraulic fluid from the various drain lines of the system after it has been used in a control operation. The first or scavenge pump is generally driven by the propeller, and it is directly connected between the first sump and the second or pressurized sump so that a reservoir of fluid is provided in the second sump under pressure and is available for use in a control function.

In the conventional system a second pump is connected between the pressurized sump and the propeller reversing mechanism to withdraw pressurized fluid from the sump and to increase its pressure and force into the reversing mechanism wherein it actuates the said mechanism to reverse the propellers. This second pump is preferably electrically operated and can be remotely controlled by the pilot or flight engineer for selective operation only when it is desired to reverse the propeller pitch.

In keeping with the present invention and as shown in the drawing, the first pump 10 has its inlet normally connected to the first or atmospheric sump by conduits or passages 12 and 14, and the outlet of the first or scavenge pump 10 is normally connected to the second or pressurized sump by the conduits or passages 16 and 18.

A selector valve 20 is operatively associated with the inlet and outlet passages of the first pump 10 so as to alter the aforementioned normal connections. That is, the selector valve 20 in the form shown has a spool 22 which is biased by a spring 24 to the position shown, this being its normal position. In such normal position fluid will flow from the atmospheric sump through the passage 14 and the valve 20 into the inlet passage 12 to the first pump 10. Also in the normal position of the spool 22, the outlet of the pump 10 is connected through the passage 16, the valve 20 and the passage 18 to the second or pressurized sump.

In addition to the foregoing, it will be observed that they are three additional passages 26, 27 and 28 connected to the valve 20. The passage 26 is connected between the first or atmospheric sump and the chamber for the valve spring 24 and it serves always to subject that chamber to the pressure of the atmospheric sump. The passage 27 is connected to the inlet of the first pump 10, but in the normal position of the valve spool 22 there is no flow through the passage 27. The passage 28 is connected to the reversing mechanism through a check valve 30 which permits flow only in the passage 28 toward the reversing mechanism. However, in the normal position of the valve spool 22, there is no flow in either direction through the passage 28. Thus, during normal operation the selector valve 20 is positioned as shown so that the propeller driven scavenge pump 10 will pump fluid from the atmospheric sump into the pressurized sump as is the case in a conventional system.

Whenever the propeller is to be reversed, the pilot or flight engineer energizes electrical pump operating means (not shown) whereby to operate the second pump 32 which is the main pump used for propeller reversing. This pump has its inlet connected by a passage 34 to the second or pressurized sump, and the outlet of the pump 32 is connected by a passage 36 to the reversing mechanism. A check valve 38 is located in the passage 36 to permit flow only in the direction of the reversing mechanism.

Now, in keeping with this invention, when the pilot starts operation of the main reversing pump 32, he can also control or operate a pilot valve 40 which acts to reposition the spool 22 in the selector valve 20. Preferably, the pilot valve 40 is solenoid operated. That is, it has a solenoid 42 which can be energized automatically when the pilot energizes the electrical control means for the main reversing pump 32 or it can be separately controlled by the pilot. When energized, the solenoid 42 moves a valve member 44 in the pilot valve 40 from its normal position (which is the full line position shown) to a second position (which is the broken line position).

The pilot valve 40 has a port 46 connected to a source of fluid under pressure, which can be the second sump, and it also has a vent passage 48 which can be connected to the first or atmospheric sump. A third passage 50 extends from the pilot valve into the selector valve 20 to direct fluid toward or away from the end of the valve spool 22 opposite that which is engaged by the spring 24. In the normal position of the pilot valve member 44, the passage 50 is connected through the pilot valve 40 to vent the selector valve 20 so that the selector valve spool 22 can assume its normal position. However, when the reversing solenoid 42 is energized, the pilot valve member 44 is positioned in its second position as indicated by the broken lines to connect the passage 50 through the valve 40 to the passage or port 46 connected to a source of fluid under pressure. This pressurized fluid will shift the valve spool 22 in the selector valve toward the right to its broken line position.

When the selector valve spool 22 is moved to the right, it will be seen that the inlet to the scavenge pump or first pump 10 will be connected to the second or pressurized sump through the passages 18 and 27, and flow from the atmospheric sump to the pump 10 will be blocked by the valve spool 22 which will prevent or shut off communication between the passages 12 and 14. At the same time, the outlet of the first pump 10 will be connected through the valve 20 to the reversing mechanism. That is, fluid will flow from the pump 10 through the passages 16 and 28 to the reversing mechanism. Thus, the propeller-driven scavenge pump will take pressurized fluid from the second sump and direct it under increased pressure and flow to the reversing mechanism to supplement the pressure and flow provided by the main reversing pump 32. This supplemental flow achieves the highly desired objective of increasing the rate of pitch change into the reverse pitch range. When the reversing of the propeller pitch has been completed, the solenoid 42 will be energized and the pilot valve member 44 will return to its normal position whereby to permit the selector valve 20 to return to its normal position whereby the first pump 10 directs fluid from the first sump only to the second sump.

The invention claimed is:
1. In an hydraulic aircraft propeller pitch control system including a mechanism for placing the propeller in reverse or braking pitch, a first sump for the collection of the pitch control fluid, a second sump for such fluid under pressure, a first pump normally operable during propeller operation to move fluid from the first to the second sump, a second pump which is selectively operable to move fluid from the second sump to the mechanism, the improvement comprising valve means normally connecting the first sump to the inlet of the first pump while connecting the first pump outlet to the second sump and having a connection with said mechanism, said valve means being operable selectively to shut off connection between said first sump and said first pump while connecting the inlet of said first pump to said second sump and the outlet of said first pump to the mechanism, whereupon the first pump assists the second pump in the supply of fluid to the reversing mechanism.

2. The improvements in a propeller pitch control system as set forth in claim 1 wherein said first pump is driven by the aircraft propeller being controlled, and wherein the second pump is driven independently of said first pump.

3. The improvements in a propeller pitch control system as set forth in claim 1 wherein said valve is operated simultaneously with operation of said second pump to shut off connection between said first sump and first pump while connecting the inlet of the first pump to the second sump and the outlet of said first pump to the mechanism.

4. The improvements in a propeller pitch control system as set forth in claim 1 wherein valve means is provided in each of the respective connections between the second pump and the mechanism and the valve and the mechanism to prevent flow from the mechanism to said second pump and said valve.

5. The improvements in a propeller pitch control system as set forth in claim 1 wherein said second pump is electrically operated and wherein an electrically controlled pilot valve is provided to operate said valve simultaneously with said second pump to shut off connection between said first sump and first pump while connecting the inlet of the first pump to the second sump and the outlet of said first pump to the mechanism.

References Cited

UNITED STATES PATENTS

| | | | |
|---|---|---|---|
| 2,777,525 | 1/1957 | Liaaen | 170—160.19 |
| 2,830,668 | 4/1958 | Gaubis et al. | 170—160.2 |
| 3,115,938 | 12/1963 | Fischer et al. | 170—160.19 |
| 3,241,694 | 3/1966 | Pedersen | 103—4 |
| 3,269,121 | 8/1966 | Bening | 230—114 |

FOREIGN PATENTS 902,850  8/1962  Great Britain.

DONLEY J. STOCKING, *Primary Examiner.*

W. J. KRAUSS, *Assistant Examiner.*

UNITED STATES PATENT OFFICE
CERTIFICATE OF CORRECTION

Patent No. 3,331,445                  July 18, 1967

Daniel P. Currie

It is hereby certified that error appears in the above numbered patent requiring correction and that the said Letters Patent should read as corrected below.

In the heading to the printed specification, lines 3 and 4, for "Daniel P. Currie, 704A Windsor Ave., Windsor, Conn. 06095" read -- Daniel P. Currie, Windsor, Conn., assignor to United Aircraft Corporation, East Hartford, Conn., a corporation of Delaware --.

Signed and sealed this 16th day of April 1968.

(SEAL)
Attest:

Edward M. Fletcher, Jr.                  EDWARD J. BRENNER

Attesting Officer                        Commissioner of Patents